United States Patent
Souma

(10) Patent No.: US 10,824,136 B2
(45) Date of Patent: Nov. 3, 2020

(54) SETTING DEVICE AND COMPUTER READABLE MEDIUM

(71) Applicant: FANUC CORPORATION, Yamanashi (JP)

(72) Inventor: Daisaku Souma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/351,687

(22) Filed: Mar. 13, 2019

(65) Prior Publication Data

US 2019/0317478 A1    Oct. 17, 2019

(30) Foreign Application Priority Data

Apr. 12, 2018   (JP) .................. 2018-076667

(51) Int. Cl.
*G05B 19/4155*    (2006.01)

(52) U.S. Cl.
CPC ............ *G05B 19/4155* (2013.01); *G05B 2219/32398* (2013.01); *G05B 2219/33127* (2013.01); *G05B 2219/35433* (2013.01); *G05B 2219/37081* (2013.01); *G05B 2219/50139* (2013.01)

(58) Field of Classification Search
CPC ...... G05B 19/4155; G05B 2219/32398; G05B 2219/33127; G05B 2219/35433; G05B 2219/37081; G05B 2219/50139
See application file for complete search history.

(56) References Cited

U.S. PATENT DOCUMENTS

| 5,829,928 | A * | 11/1998 | Harmand ........... B23C 3/055 408/83.5 |
| 10,423,945 | B2 * | 9/2019 | Long ................ G01B 5/0023 |
| 10,459,427 | B2 * | 10/2019 | Sinn ............. G05B 19/40937 |
| 2003/0023341 | A1 * | 1/2003 | Sagawa ........... G05B 19/4093 700/159 |
| 2003/0182014 | A1 * | 9/2003 | McDonnell ....... G05B 19/4065 700/159 |
| 2007/0173963 | A1 * | 7/2007 | Bjornson .......... G06Q 10/087 700/90 |
| 2018/0189758 | A1 * | 7/2018 | Beach ............. A63B 71/0619 |

FOREIGN PATENT DOCUMENTS

| JP | H10-207514 | 8/1998 |
| JP | 2003-295916 | 10/2003 |
| JP | 3827951 | 7/2006 |
| JP | 2017-215675 | 12/2017 |

* cited by examiner

*Primary Examiner* — Abdelmoniem I Elamin
(74) *Attorney, Agent, or Firm* — Wenderoth, Lind & Ponack, L.L.P.

(57) ABSTRACT

An object is to more appropriately perform settings in the setting of the control of a machine tool. A setting device includes: a first reception unit which receives the specification of a first setting value for at least one or more parameters on the control of a machine tool; a second reception unit which receives the specification of a second setting value for the parameter after the reception of the first setting value; a third reception unit which receives the specification of a selection condition for determining which one of the first setting value and the second setting value is selected; and a selection unit which selects, based on the selection condition whose specification is received by the third reception unit, any one of the first setting value and the second setting value as a setting value that is applied to the parameter.

7 Claims, 6 Drawing Sheets

FIG. 3

PURPOSE OF MACHINING:CYCLE TIME REDUCTION

| ITEM | USER SETTING VALUE | RECOMMENDED SETTING VALUE | | APPLICATION VALUE | SELECTION CONDITION |
|---|---|---|---|---|---|
| IN-POSITION WIDTH | 0.2mm | 0.1mm | ⇑ | 0.2mm | LARGER ONE |
| FEED SPEED | 1200mm/min | 800mm/min | ⇑ | 1200mm/min | LARGER ONE |
| FEEDFORWARD COEFFICIENT | 0% | 98% | ⇑ | 98% | LARGER ONE |
| ... | ... | ... | | ... | ... |

FIG. 4

PURPOSE OF MACHINING: MACHINING ACCURACY ENHANCEMENT

| ITEM | USER SETTING VALUE | RECOMMENDED SETTING VALUE | | APPLICATION VALUE | SELECTION CONDITION |
|---|---|---|---|---|---|
| IN-POSITION WIDTH | 0.2mm | 0.1mm | ⇑ | 0.1mm | SMALLER ONE |
| FEED SPEED | 1200mm/min | 800mm/min | ⇑ | 800mm/min | SMALLER ONE |
| FEEDFORWARD COEFFICIENT | 0% | 98% | ⇑ | 98% | LARGER ONE |
| ... | ... | ... | | ... | ... |

FIG. 6

| | AR11 | AR21 | AR22 | AR23 AR24 | AR25 |

| X AXIS | | | USER SETTING VALUE | RECOMMENDED SETTING VALUE | |
|---|---|---|---|---|---|
| IN-POSITION WIDTH | | | — | 0.1 | mm |
| FEED SPEED | | | 1200 | 800 | mm/min |
| FEEDFORWARD COEFFICIENT | | | 0 | 98.00 | ms |

NO.1826 IN-POSITION WIDTH FOR EACH AXIS
WHEN DISPLACEMENT (ABSOLUTE VALUE OF POSITIONAL DEVIATION AMOUNT) BETWEEN MACHINE POSITION AND COMMAND POSITION IS SMALLER THAN WIDTH OF IN-POSITION, IT IS REGARDED THAT MACHINE REACHES COMMAND POSITION, THAT IS, IN-POSITION

| X AXIS | | USER SETTING VALUE | RECOMMENDED SETTING VALUE | |
|---|---|---|---|---|
| IN-POSITION WIDTH | | 0.2 | 0.1 | mm |
| FEED SPEED | | 1200 | 800 | mm/min |
| FEEDFORWARD COEFFICIENT | | 0 | 98.00 | ms |

NO.1826 IN-POSITION WIDTH FOR EACH AXIS
WHEN DISPLACEMENT (ABSOLUTE VALUE OF POSITIONAL DEVIATION AMOUNT) BETWEEN MACHINE POSITION AND COMMAND POSITION IS SMALLER THAN WIDTH OF IN-POSITION, IT IS REGARDED THAT MACHINE REACHES COMMAND POSITION, THAT IS, IN-POSITION

AR31

SETTING DEVICE AND COMPUTER READABLE MEDIUM

This application is based on and claims the benefit of priority from Japanese Patent Application No. 2018-076667, filed on 12 Apr. 2018, the content of which is incorporated herein by reference.

BACKGROUND OF THE INVENTION

Field of the Invention

The present invention relates to a setting device and a computer readable medium for performing settings on the control of a machine tool.

Related Art

Conventionally, a computerized numerical control (CNC) device controls a machine tool so as to realize machining based on machining programs. In the control of the computerized numerical control device, setting values are individually provided for various parameters (for example, parameters such as an in-position width and a feedforward coefficient), and the control based on the setting values is performed.

An example of a technology on the setting of parameters as described above is disclosed in patent document 1. In the technology disclosed in patent document 1, setting values for reference parameters are replaced by setting values which correspond to the specification of a user. In this way, the setting values for the parameters can be changed to the desired values of the user.

Patent Document 1: Japanese Patent No. 3827951

SUMMARY OF THE INVENTION

However, the desired values of the user are not always appropriate values. For example, depending on machining conditions (for example, conditions in which the cycle time of machining is desired to be reduced), it may be appropriate that setting values for reference parameters are not changed. However, in a general technology such as the technology disclosed in patent document 1, the setting values are only replaced according to the specification of the user in a uniform manner.

The present invention is made in view of such a situation, and an object thereof is to provide a setting device and a setting program for more appropriately performing settings in the setting of the control of a machine tool.

(1) A setting device (for example, a computerized numerical control device 1 which will be described later) includes: a first reception unit (for example, a specification reception unit 112 which will be described later) which receives the specification of a first setting value for at least one or more parameters on the control of a machine tool; a second reception unit (for example, a specification reception unit 112 which will be described later) which receives the specification of a second setting value for the parameter after the reception of the first setting value; a third reception unit (for example, a specification reception unit 112 which will be described later) which receives the specification of a selection condition for determining which one of the first setting value and the second setting value is selected; and a selection unit (for example, an application value selection unit 113 which will be described later) which selects, based on the selection condition whose specification is received by the third reception unit, any one of the first setting value and the second setting value as a setting value that is applied to the parameter.

(2) Preferably, in the setting device of (1) described above, the selection condition is provided for each purpose of machining performed by the machine tool, and the first setting value is previously specified according to the purpose of the machining corresponding to the selection condition.

(3) Preferably, the setting device of (1) or (2) described above, further includes: a presentation unit (for example, a presentation unit 111 which will be described later) which presents at least any one of the first setting value, the second setting value and information indicating which one of the first setting value and the second setting value is selected by the selection unit, and the selection unit selects again, based on a specification from a presentation destination in the presentation, any one of the first setting value and the second setting value as the setting value that is applied to the parameter.

(4) Preferably, the setting device of any one of (1) to (3) described above, further includes: a machine tool control unit (for example, a machine tool control unit 114 which will be described later) which applies any one of the first setting value and the second setting value selected by the selection unit to the parameter so as to control the machine tool based on the applied setting value.

(5) Preferably, in the setting device of any one of (1) to (4) described above, the selection condition is provided for each purpose of machining performed by the machine tool, and is a condition in which selection criteria for the first setting value and the second setting value individually differ according to the purpose of the machining.

(6) Preferably, in the setting device of any one of (1) to (5) described above, the selection condition includes at least any one of a condition on the accuracy of machining and a condition on the time of the machining in the machining of the machine tool.

(7) Preferably, in the setting device of any one of (1) to (6) described above, the first setting value includes at least any one of the average value, the maximum value and the minimum value of the setting value applied to the parameter.

(8) Preferably, in the setting device of any one of (1) to (7) described above, the parameter includes at least any one of a setting related to a position, a setting related to a speed, a setting related to acceleration, a setting related to jerk, a setting related to torque and a setting related to servo motor control in the control of the machine tool.

(9) A setting program realizes, in a computer (for example, a computerized numerical control device 1 which will be described later): a first reception function of receiving the specification of a first setting value for at least one or more parameters on the control of a machine tool; a second reception function of receiving the specification of a second setting value for the parameter after the reception of the first setting value; a third reception function of receiving the specification of a selection condition for determining which one of the first setting value and the second setting value is selected; and a selection function of selecting, based on the selection condition whose specification is received by the third reception function, any one of the first setting value and the second setting value as a setting value that is applied to the parameter.

According to the present invention, it is possible to provide a setting device and a setting program for more appropriately performing settings in the setting of the control of a machine tool.

BRIEF DESCRIPTION OF THE DRAWINGS

FIG. 3 is a table showing an example of setting conditions in the setting value selection processing performed in the computerized numerical control device included in the embodiment of the present invention;

FIG. 4 is a table showing another example of the setting conditions in the setting value selection processing performed in the computerized numerical control device included in the embodiment of the present invention;

FIG. 6 is a schematic view showing an example of a setting screen in the setting value selection processing performed in the computerized numerical control device included in the embodiment of the present invention; and FIG. 7 is a schematic view showing another example of the setting screen in the setting value selection processing performed in the computerized numerical control device included in the embodiment of the present invention.

DETAILED DESCRIPTION OF THE INVENTION

An embodiment of the present invention will be described in detail below with reference to drawings. In the present embodiment, a recommended setting value for at least one or more parameters on the control of a machine tool is stored. In the present embodiment, a predetermined user interface is displayed, and with this user interface, a user setting value desired by the user of the machine tool is received. Furthermore, in the present embodiment, with this user interface, the specification of a selection condition for determining which one of the setting values is selected is further received.

Then, in the present embodiment, based on the specified selection condition, any one of the recommended setting value and the user setting value is selected, and thus the machine tool is controlled based on the selected setting value. In this way, in the present embodiment, it is possible to conveniently select an appropriate parameter setting value corresponding to the selection condition.

<Overall Configuration>

Figure 1:
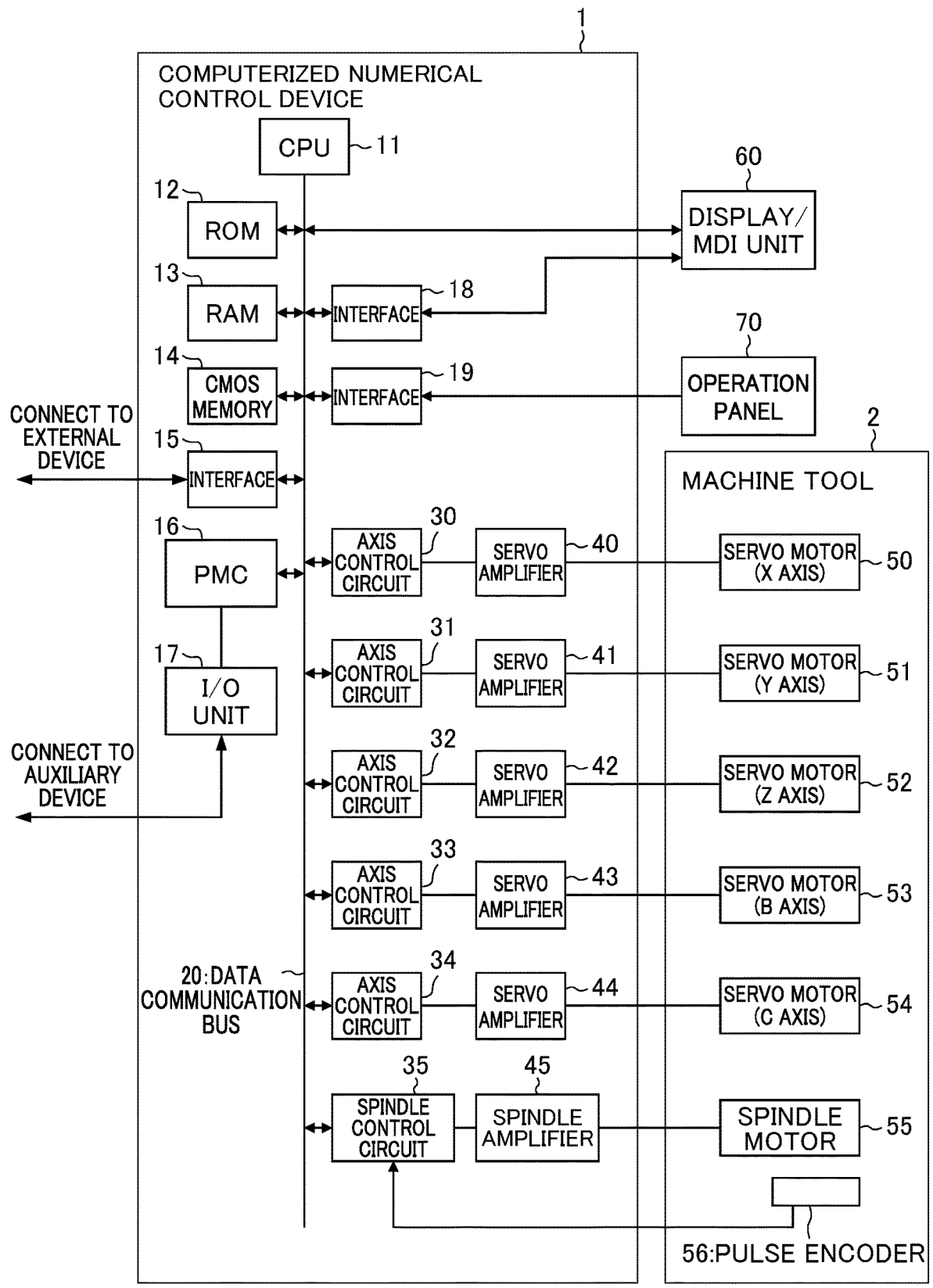
FIG. 1 is a block diagram showing the configurations of a computerized numerical control device, a machine tool and the like included in an embodiment of the present invention.

As shown in FIG. 1, the present embodiment includes a computerized numerical control device 1 and a machine tool 2. The computerized numerical control device 1 controls the machine tool 2 based on setting values for various types of parameters so as to realize machining corresponding to machining programs. The machine tool 2 is a device which performs machining such as cutting machining and laser beam machining based on the control of the computerized numerical control device 1. The details of the machining performed by the computerized numerical control device 1 and the machine tool 2 and a workpiece which is a machining target are not particularly limited. In other words, the present embodiment can be applied to an arbitrary computerized numerical control device 1 and an arbitrary machine tool 2 which perform arbitrary machining.

The computerized numerical control device 1 and the machine tool 2 are connected together so as to be able to transmit and receive a predetermined signal. For example, they are connected together so as to be able to transmit and receive a current command value (torque command value) which is output from the computerized numerical control device 1 to the machine tool 2 in order to control a motor. In addition, for example, they are connected together so as to be able to transmit and receive a feedback signal which is output from the machine tool 2 to the computerized numerical control device 1 in order to perform feedback control. Although in the present embodiment, as an example of the description, the machine tool 2 is assumed to be a machining machine which performs various types of machining, there is no limitation to this configuration. In addition to the machining machine, the machine tool 2 widely includes a transport mechanism and a movement mechanism which do not directly perform machining and industrial machines such as a robot.

<Hardware Configuration>

The hardware configurations of the computerized numerical control device 1 and the machine tool 2 will then be described in detail. The computerized numerical control device 1 includes a CPU 11, a ROM 12, a RAM 13, a CMOS memory 14, an interface 15, a PMC 16, an I/O unit 17, an interface 18, an interface 19, a data communication bus 20, axis control circuits 30 to 34, servo amplifiers 40 to 44, a spindle control circuit 35, a spindle amplifier 45, a display/MDI unit 60 and an operation panel 70.

The machine tool 2 includes servo motors 50 to 54, a spindle motor 55 and a pulse encoder 56. The detailed description of tools connected to these motors, a table on which the workpiece is mounted and the like will be omitted.

The CPU 11 is a processor which functions as a control unit for totally controlling the computerized numerical control device 1. The ROM 12 is a storage device in which various types of programs are stored. Here, the various types of programs stored in the ROM 12 include at least programs for realizing the functions of a general computerized numerical control device and programs for realizing setting value selection processing in the present embodiment. In the ROM 12, as part of the programs for realizing the functions of the general computerized numerical control device, various type of system programs for performing the processing of an edition mode necessary for production and edition of the machining programs and processing for an automatic operation are also written.

The CPU 11 reads the programs stored in the ROM 12 through a data communication bus 20, and performs computations based on the read programs while extending the read programs to the RAM 13. Then, the CPU 11 controls, based on the results of the computations, the hardware included in the computerized numerical control device 1 so as to realize the functions of the present embodiment which will be described later with reference to FIG. 2 and the like. In other words, the present embodiment can be realized by coordination of the hardware and the software.

In the RAM 13, temporary calculation data in computation processing performed by the CPU 11, display data and various types of data input by the user through the interface 15 and the display/MDI unit 60 are stored. Here, the various types of data input by the user through the interface 15 and the display/MDI unit 60 are, for example, various types of information such as user setting values.

The CMOS memory 14 is formed as a nonvolatile memory which is backed up by a battery that is not shown and which holds a storage state even when the power of the computerized numerical control device 1 is turned off. In the CMOS memory 14, the machining program read through the interface 15, the machining program input through the display/MDI unit 60 and the like are stored. These machining programs are produced by the utilization of CAD (Computer Aided Design) and CAM (Computer Aided Manufacturing) by a designer.

The interface 15 enables the connection of the computerized numerical control device 1 and an external device such as an adaptor. The machining programs, various types of parameters and the like are read from the side of the external device. The machining program which is edited within the computerized numerical control device 1 can be stored in an external storage means through the external device.

The PMC (Programmable Machine Controller) 16 is a device which is generally called a PLC (Programmable Logic Controller). With a sequence program incorporated in the computerized numerical control device 1, the PMC 16 outputs signals to an auxiliary device (for example, an actuator such as a robot hand for replacement of tools) of the machine tool through the I/O unit 17 so as to perform control. The PMC 16 receives the signals of various types of switches and the like in the operation panel installed in the main body of the machine tool, performs necessary signal processing and thereafter feeds them to the CPU 11.

The display/MDI unit 60 is a manual data input/output device which has the function of displaying predetermined information for the user and the function of receiving an operation from the user. The display/MDI unit 60 is realized by, for example, a display, a keyboard, a mouse, a touch panel or the like or a combination thereof.

The interface 18 receives a command or data based on a user operation received in the display/MDI unit 60 and feeds it to the CPU 11. The interface 19 is connected to the operation panel 70 which includes a manual pulse generator and the like.

The axis control circuits 30 to 34 of individual axes receive the movement command amounts of the individual axes from the CPU 11, and output the commands of the individual axes to the servo amplifiers 40 to 44.

The servo amplifiers 40 to 44 receive the commands of the individual axes from the axis control circuits 30 to 34 so as to drive the servo motors 50 to 54. The servo motors 50 to 54 of the individual axes incorporate position/speed detectors, and feed back position/speed feedback signals from the position/speed detectors to the axis control circuits 30 to 34 so as to perform position/speed feedback control. In the figure, the illustration of the position/speed feedback is omitted. In the figure, as an example of the description, a configuration is shown in which the machine tool 2 includes five axes of an X axis, a Y axis, a Z axis, a B axis and a C axis.

The spindle control circuit 35 receives a spindle rotation command for the machine tool so as to output a spindle speed signal to the spindle amplifier 45. The spindle amplifier 45 receives the spindle speed signal so as to rotate the spindle motor 55 of the machine tool at a rotation speed commanded and thereby drive the tool.

The pulse encoder 56 is coupled to the spindle motor 55 with a gear, a belt or the like, the pulse encoder 56 outputs a feedback pule in synchronization with the rotation of the spindle and the feedback pulse is read by the CPU 11 through the data communication bus 20.

<Functional Configurations>

Figure 2:
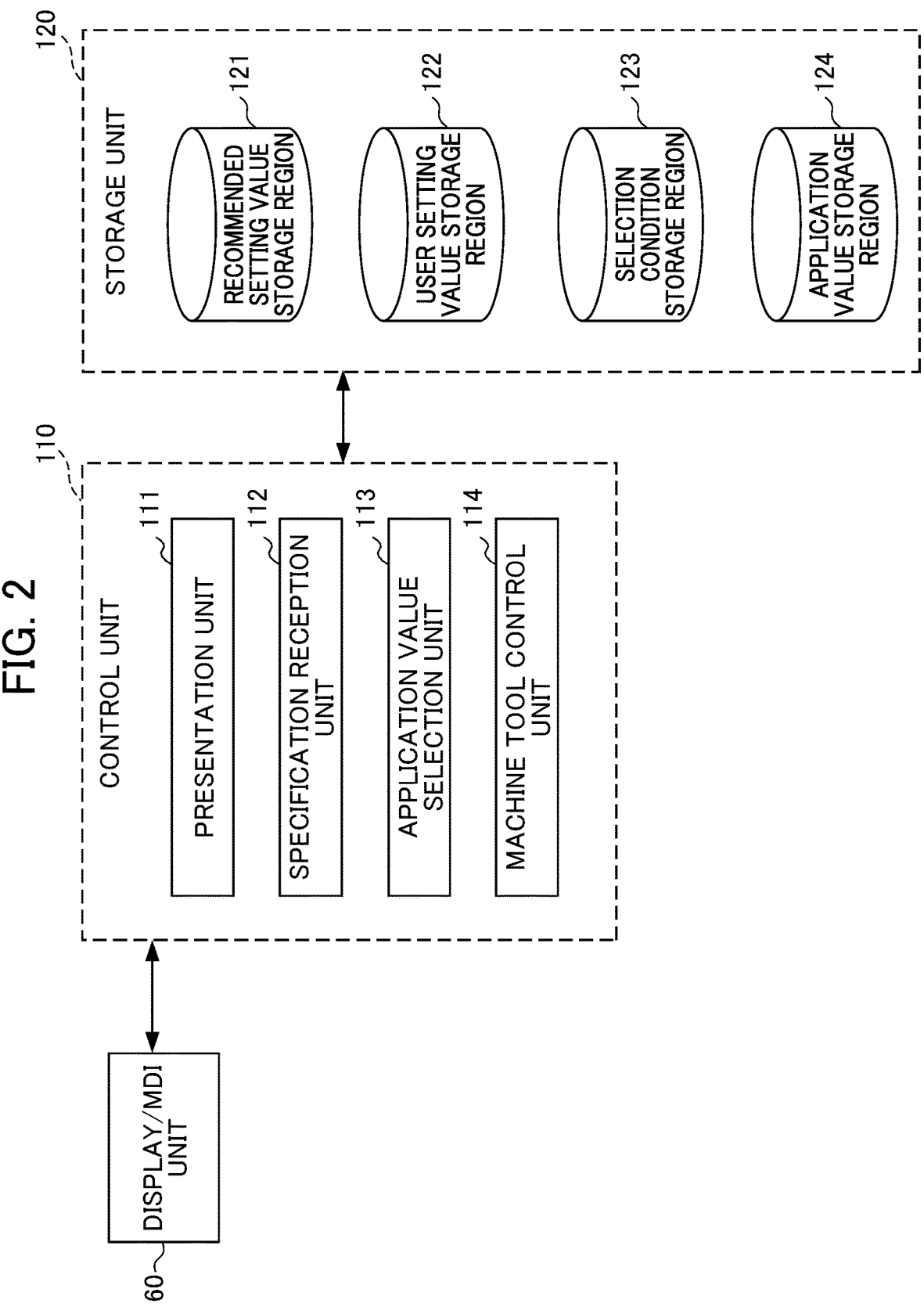
FIG. 2 is a function block diagram showing a functional configuration for performing setting value selection processing among the functional configurations of the computerized numerical control device included in the embodiment of the present invention.

The functional configurations of the computerized numerical control device 1 will then be described. FIG. 2 is a function block diagram showing a functional configuration for performing the setting value selection processing among the functional configurations of the computerized numerical control device 1 in FIG. 1. The setting value selection processing is a series of processing steps which selects, based on the specification of the user and the like, a setting value applied to a parameter and which controls the machine tool 2 based on the selected setting value.

When the setting value selection processing is performed, as shown in FIG. 2, a control unit 110 and a storage unit 120 function. Here, the control unit 110 and the storage unit 120 are realized by the coordination of the CPU 11, the ROM 12, the RAM 13, the CMOS memory 14 and the like shown in FIG. 1.

More specifically, when the setting value selection processing is performed, as shown in FIG. 2, in the control unit 110, a presentation unit 111, a specification reception unit 112, an application value selection unit 113 and a machine tool control unit 114 function. When the setting value selection processing is performed, in one region of the storage unit 120, a recommended setting value storage region 121, a user setting value storage region 122, a selection condition storage region 123 and an application value storage region 124 are set.

The recommended setting value storage region 121 is a region in which setting values (hereinafter referred to as "recommended setting values") that are individually recommended for parameters on the control of the machine tool are stored. The user setting value storage region 122 is a region in which setting values (hereinafter referred to as "user setting values") that are individually specified by the user for the parameters described above are stored.

Here, the recommended setting values are specified by, for example, makers which manufacture the computerized numerical control device 1 and the machine tool 2. The recommended setting values are specified for each of the sizes of machines (for example, small, medium and large sizes) and for each of the purposes of machining by use of, as sample data, existing setting values obtained by statistics of the makers. For example, any one of the average value, the maximum value and the minimum value of the existing setting value is specified as the recommended setting value. Although the recommended setting values are setting values which are recommended by the markers so as to be suitable, various applications are assumed, and thus the recommended setting values are set, with the result that the recommended setting values are not always the optimum values depending on the request and application of the user. Hence, in the present embodiment, the user setting values specified by the user are allowed to be applied to the parameters.

The parameters to which the recommended setting values and the user setting values can be applied are not particularly limited. In other words, the parameters which are set to the targets of the setting value selection processing are not particularly limited. For example, when the parameters are setting parameters related to positions in the control of the machine tool 2, parameters such as an "in-position width" and a "tolerance amount" can be set to the targets of the setting value selection processing. In addition, for example, when the parameters are setting parameters related to speeds in the control of the machine tool 2, parameters such as "speeds of a feed axis (for example, upper limit/lower limit speeds" and an "allowable speed difference" can be set to the targets of the setting value selection processing. In addition, for example, when the parameters are setting parameters related to acceleration in the control of the machine tool 2, parameters such as the "maximum allowable acceleration" and the "time constant of acceleration/deceleration" can be set to the targets of the setting value selection processing.

In addition, for example, when the parameters are setting parameters related to jerk in the control of the machine tool 2, parameters such as an "allowable acceleration change amount" can be set to the targets of the setting value selection processing. In addition, for example, when the parameters are setting parameters related to torque in the control of the machine tool 2, parameters such as the "torque of a motor" can be set to the targets of the setting value selection processing. In addition, for example, when the parameters are setting parameters related to servo motor control in the control of the machine tool 2, parameters such as a "position loop gain", a "speed loop gain", a "cutting time-speed loop gain magnification", a "feedforward coefficient" and an "overlap amount" can be set to the targets of the setting value selection processing.

The selection condition storage region 123 is a region in which selection conditions for determining which one of the recommended setting value and the user setting value is selected as an application value applied to the parameter are stored. The details of the selection conditions will be described later in the description of the application value selection unit 113.

The application value storage region 124 is a region in which the setting values (hereinafter referred to as "application values") that are the recommended setting values or the user setting values selected by the application value selection unit 113 and that are applied to the parameters are stored. The machine tool control unit 114 which will be described later controls the machine tool 2 based on the application values.

The presentation unit 111 includes the function of presenting a setting user interface with which the user specifies the user setting value and the selection condition so as to determine the application value. The presentation unit 111 generates image data corresponding to the setting user interface. The presentation unit 111 displays the generated setting user interface on the display or the like included in the display/MDI unit 60 so as to present the setting user interface. A specific example of the setting user interface will be described later with reference to FIGS. 6 and 7. The presentation of the presentation unit 111 may be a display for another device which is connected through the communication of a network or the like or may involve the output of a sound or the like.

The specification reception unit 112 includes the function of receiving the specifications of the user. The specifications of the user are, for example, the specification of the user setting value and the specification of the purpose of machining corresponding to the selection condition. In addition, the specifications of the user are the specification of change of the setting value selected in the application value selection unit 113 based on these specifications and the specification of application of the selected setting value to the parameter. The specification reception unit 112 receives the specifications of the user based on an operation of the user input with the keyboard, the mouse or the like included in the display/MDI unit 60. The reception of the specifications of the user with the specification reception unit 112 may be performed through another device which is connected through the communication of a network or the like.

The application value selection unit 113 includes the function of selecting, as the application value, any one of the recommended setting value stored in the recommended setting value storage region 121 and the user setting value stored in the user setting value storage region 122. The application value selection unit 113 stores the selected application value in the application value storage region 124.

As described above, the selection of the application value by the application value selection unit 113 is performed based on the selection condition stored in the selection condition storage region 123. For example, the selection condition is provided for each of the purposes (for example, the accuracy of machining and the speed of machining) of machining with the machine tool 2. The selection condition individually differs in a selection criterion for determining which one of the recommended setting value and the user setting value is selected according to the purpose of machining. The recommended setting value may individually differ according to the purpose of machining.

As specific examples of the selection condition, in FIG. 3, selection conditions corresponding to the purpose of machining "cycle time reduction" are shown. As other specific examples of the selection condition, in FIG. 4, selection conditions corresponding to the purpose of machining "machining accuracy enhancement" are shown. These selection conditions include, as target parameters for which application values are selected based on the selection conditions, the "in-position width", a "feed speed" and the "feedforward coefficient".

Here, the "in-position width" is a parameter which indicates a width for determining whether or not a locating operation is completed in the control of the machine tool 2. In the control of the machine tool 2, the computerized numerical control device 1 determines, when a positional deviation falls within the in-position width, that a movement is completed, and starts the subsequent movement. Although the cycle time is reduced as the in-position width is increased, the accuracy of machining is lowered.

Hence, in the selection condition corresponding to the purpose of machining "cycle time reduction" shown in FIG. 3, a selection criterion of selecting, as an application value, a setting value with larger in-position width is provided so as to reduce the cycle time. For example, as shown in FIG. 3, when the user setting value of the "in-position width" is "0.2 mm" and the recommended setting value thereof is "0.1 mm", the application value selection unit 113 selects, based on the selection condition, as an application value, the user setting value of "0.2 mm" with larger in-position width.

On the other hand, in the selection condition corresponding to the purpose of machining "machining accuracy enhancement" shown in FIG. 4, a selection criterion of selecting, as an application value, a setting value with smaller in-position width is provided so as to enhance the accuracy of machining. For example, as shown in FIG. 4, when the user setting value of the "in-position width" is "0.2 mm" and the recommended setting value thereof is "0.1 mm", the application value selection unit 113 selects, based on the selection condition, as an application value, the recommended setting value of "0.1 mm" with smaller in-position width.

Likewise, although the cycle time is reduced as the "feed speed" is increased, the accuracy of machining is lowered. Hence, in the selection condition corresponding to the purpose of machining "cycle time reduction" shown in FIG. 3, a selection criterion of selecting, as an application value, a setting value whose feed speed is larger is provided so as to reduce the cycle time. On the other hand, in the selection condition corresponding to the purpose of machining "machining accuracy enhancement" shown in FIG. 4, a selection criterion of selecting, as an application value, a setting value whose feed speed is smaller is provided so as to enhance the accuracy of machining.

By contrast, the cycle time is reduced and the accuracy of machining is enhanced as the "feedforward coefficient" is increased. Hence, in the selection condition corresponding to the purpose of machining "cycle time reduction" shown in FIG. 3, a selection criterion of selecting, as an application value, a setting value whose feedforward coefficient is larger is provided so as to reduce the cycle time. In the selection condition corresponding to the purpose of machining "machining accuracy enhancement" shown in FIG. 4, a selection criterion of selecting, as an application value, a setting value whose feedforward coefficient is larger is provided so as to enhance the accuracy of machining. As described above, the selection conditions are specified such that the setting values corresponding to the purposes of machining are individually selected. Hence, the application value selection unit 113 can individually select appropriate setting values corresponding to the purposes of machining.

With reference back to FIG. 2, the machine tool control unit 114 includes the function of controlling the machine tool 2 based on the application values applied to the individual parameters. The machine tool control unit 114 controls the machine tool 2 based on the application values applied to the parameters such as the "in-position width", the "feed speed" and the "feedforward coefficient" selected as described above by the application value selection unit 113. The control of the machine tool based on the application values applied to the parameters which is performed by the computerized numerical control device is well known by a person skilled in the art, and thus the detailed description thereof will be omitted here.

<Operation>

Figure 5:
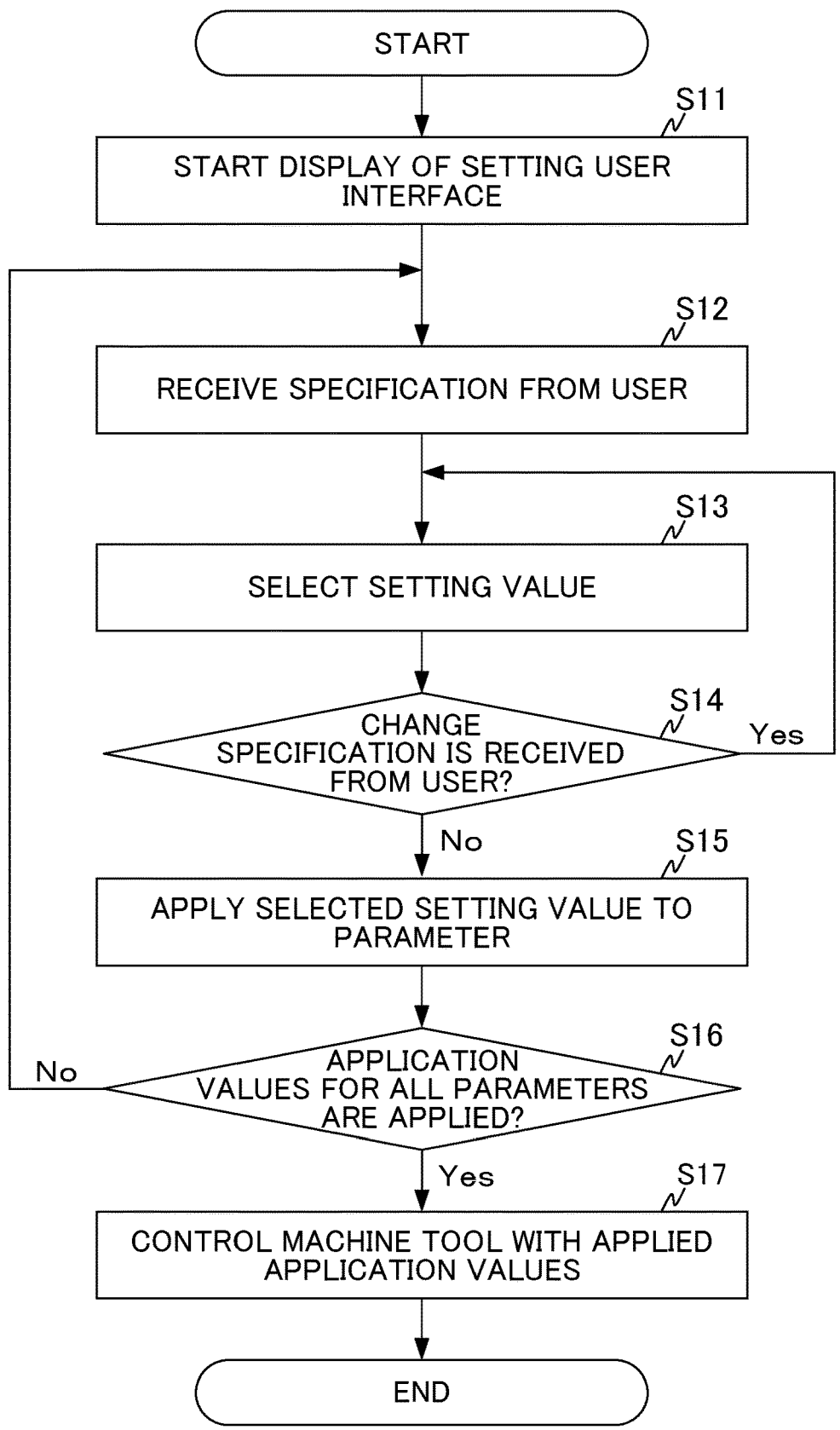
FIG. 5 is a flowchart showing a series of operations in the setting value selection processing performed in the computerized numerical control device included in the embodiment of the present invention.

FIG. 5 is a flowchart illustrating the flow of the setting value selection processing performed by the computerized numerical control device 1 of FIG. 1 having the functional configuration of FIG. 2.

In step S11, the presentation unit 111 starts the display of the setting user interface. Until subsequent step S17, the display of the setting user interface is continued.

In step S12, the specification reception unit 112 receives specifications from the user. For example, the specification reception unit 112 receives the specification of the user setting value and the specification of the purpose of machining corresponding to the selection condition.

In step S13, the application value selection unit 113 selects, based on the selection condition corresponding to the purpose of machining specified in step S12, any one of the recommended setting value and the user setting value specified in step S12.

In step S14, the application value selection unit 113 determines whether or not a specification of changing the recommended setting value or the user setting value selected in step S13 is received from the user. When the specification of the changing is received from the user, the determination in step S14 is yes, and thus the process is returned to step S13. Then, in step S13 which is performed again, the specification reception unit 112 selects the setting value after being changed. In other words, when in step S13 previously performed, the recommended setting value is selected, the recommended setting value is changed such that the user setting value is selected. When in step S13 previously performed, the user setting value is selected, the user setting value is changed such that the recommended setting value is selected. On the other hand, when the specification of the changing is not received from the user, the determination in step S14 is no, and thus the process proceeds to step S15.

In step S15, the application value selection unit 113 applies, as an application value, the recommended setting value or the user setting value selected in step S13 performed immediately before to the parameter.

In step S16, the application value selection unit 113 determines whether or not application values are applied to all the parameters in the processing described above. When the application values are applied to all the parameters, the determination in step S16 is yes, and thus the process proceeds to step S17. On the other hand, when the application values are not applied to all the parameters, the determination in step S16 is no, and thus the process is returned to step S12. Then, the process is repeatedly performed on the parameter to which an application value has not been applied yet.

In step S17, the machine tool control unit 114 controls the machine tool 2 based on the application values applied to the individual parameters. In this way, the setting value selection processing is completed.

<Setting User Interface>

A specific example of the setting user interface displayed in the setting value selection processing discussed above will then be described with reference to FIGS. 6 and 7. It is assumed this time that the purpose of machining "cycle time reduction" shown in FIG. 3 is specified.

As shown in FIGS. 6 and 7, the setting user interface includes, as display regions for displaying predetermined information, a display region AR11, a display region AR21, a display region AR22, a display region AR23, a display region AR24, a display region AR25 and a display region AR31.

In the display region AR11, information indicating an axis which is currently a target set in the setting value selection processing is displayed. In the display region AR21, the parameter names of parameters which are targets set in the setting value selection processing are displayed. In the display region AR22, for each of the parameters, information indicating whether or not the user setting value is selected is displayed. For example, when the user setting value is selected, a filled check box is displayed.

In the display region AR23, user setting values which individually correspond to the parameters are displayed. In the display region AR24, for each of the parameters, information indicating whether or not the recommended setting value is selected is displayed. For example, when the recommended setting value is selected, a filled check box is displayed. In the display region AR25, recommended setting values which individually correspond to the parameters are displayed. In the display region AR31, the details of the parameter that is currently selected as a target to which the user setting value is input are displayed. The user can input the user setting value with reference to the details thereof.

In the example of FIGS. 6 and 7, for the feed speed and the feedforward coefficient, based on the selection conditions included in the purpose of machining "cycle time reduction" shown in FIG. 3, the recommended setting values have been selected. Here, a case where the user further sets the in-position width will be described as an example. When as indicated in the display region AR23 of FIG. 6, the specification of the user setting value has not been performed yet, the recommended setting value is selected as indicated in the display region AR24 of FIG. 6.

It is assumed that as indicated in the display region AR23 of FIG. 7, the user setting value of "0.2" is thereafter input (which corresponds to step S13 in FIG. 5). In this case, as indicated in the display region AR22 of FIG. 7, based on the selection condition included in the purpose of machining "cycle time reduction" shown in FIG. 3, the application value selection unit 113 selects the user setting value (which corresponds to step S14 in FIG. 5). When the user setting value preferably remains selected, the user who references the display shown in FIG. 7 does not particularly perform the specification of change (which corresponds to no in step S14 of FIG. 5). On the other hand, when the user who references the display shown in FIG. 7 insists on changing to the recommended setting value, the user performs the specification of the change (which corresponds to yes in step S14 of FIG. 5).

In this way, the user can conveniently select appropriate parameter setting values corresponding to selection conditions by utilization of the setting user interface. When the user wants to select setting values other than the setting values corresponding to the selection conditions, the user can select the other setting values. Hence, even if the setting values corresponding to the selection conditions differ from those desired by the user, it is possible to perform the selection reflecting the intention of the user.

Although the embodiment described above is a preferred embodiment of the present invention, the scope of the present invention is not limited to only the embodiment described above, and the present embodiment can be practiced in forms in which various modifications are performed without departing from the spirit of the present invention. For example, the embodiment described above can be practiced in forms in which various modifications are performed as in variations that will be described below.

<Realization by Software>

In the embodiment described above, the individual constituent units included in the computerized numerical control device 1 can be realized by hardware, software or a combination thereof. A setting method which is performed by coordination of the individual constituent units included in the computerized numerical control device 1 can also be realized by hardware, software or a combination thereof. Here, the realization by software means that a computer reads and executes a program so as to achieve the realization.

In this case, the software can be stored in various types of non-transitory computer readable media and supplied to the computer. The non-transitory computer readable media include various types of tangible storage media. Examples of the non-transitory computer readable media include magnetic recording media (for example, a flexible disk, a magnetic tape and a hard disk drive), magneto-optical recording media (for example, a magneto-optical disc), a CD-ROM (Read Only Memory), a CD-R, a CD-R/W, semiconductor memories (for example, a mask ROM and a PROM (programmable ROM), an EPROM (Erasable PROM), a flash ROM and a RAM (random access memory). The software may also be supplied to the computer with various types of transitory computer readable media. Examples of the transitory computer readable media include an electrical signal, an optical signal and electromagnetic waves. The transitory computer readable media can supply programs to the computer through a wired communication path such as an electric wire or an optical fiber or a wireless communication path.

EXPLANATION OF REFERENCE NUMERALS 1 computerized numerical control device
11 CPU
12 ROM
13 RAM
14 CMOS memory
15, 18, 19 interface
16 PMC
17 I/O unit
20 data communication bus
30 to 34 axis control circuit
40 to 44 servo amplifier
50 to 54 servo motor
35 spindle control circuit
45 spindle amplifier
55 spindle motor
56 pulse encoder
60 display/MDI unit
70 operation panel
110 control unit
111 presentation unit
112 specification reception unit
113 application value selection unit
114 machine tool control unit
120 storage unit
121 recommended setting value storage region
122 user setting value storage region
123 selection condition storage region
124 application value storage region

What is claimed is:

1. A setting device comprising: a memory configured to store a program; and
   a processor configured to execute the program and control the setting device to:
   receive a specification of a first setting value for at least one or more parameters on control of a machine tool;
   receive a specification of a second setting value for the parameter after the reception of the first setting value;
   receive a specification of a selection condition for determining which one of the first setting value and the second setting value is selected; and
   select, based on the selection condition whose specification is received, any one of the first setting value and the second setting value as a setting value that is applied to the parameter;
   wherein the selection condition is provided for each purpose of machining performed by the machine tool and is a condition in which selection criteria for the first setting value and the second setting value individually differ according to the purpose of the machining; and
   wherein the processor is further configured to execute the program and control the setting device to apply any one of the first setting value and the second setting value selected to the parameter so as to control the machine tool based on the applied setting value.

2. The setting device according to claim 1,
   wherein the selection condition is provided for each purpose of machining performed by the machine tool, and
   the first setting value is previously specified according to the purpose of the machining corresponding to the selection condition.

3. The setting device according to claim 1,
   wherein the processor is further configured to execute the program and control the setting device to present at least any one of the first setting value, the second setting value and information indicating which one of the first setting value and the second setting value is selected by the selection unit, wherein the processor is further configured to execute the program and control the setting device to select again, based on a specification from a presentation destination in the presentation, any one of the first setting value and the second setting value as the setting value that is applied to the parameter.

4. The setting device according to claim 1, wherein the selection condition includes at least any one of a condition on accuracy of machining and a condition on a time of the machining in the machining of the machine tool.

5. The setting device according to claim 1, wherein the first setting value includes at least any one of an average value, a maximum value and a minimum value of the setting value applied to the parameter.

6. The setting device according to claim 1, wherein the parameter includes at least any one of a setting related to a position, a setting related to a speed, a setting related to acceleration, a setting related to jerk, a setting related to torque and a setting related to servo motor control in the control of the machine tool.

7. A non-transitory computer readable medium storing a setting program, that causes a processor of a setting device to execute:

receiving a specification of a first setting value for at least one or more parameters on control of a machine tool;

receiving a specification of a second setting value, for the parameter after the reception of the first setting value;

receiving a specification of a selection condition for determining which one of the first setting value and the second setting value is selected; and selecting, based on the selection condition whose specification is received, any one of the first setting value and the second setting value as a setting value that is applied to the parameter;

wherein the selection condition is provided for each purpose of machining performed by the machine tool, and is a condition in which selection criteria for the first setting value and the second setting value individually differ according to the purpose of the machining; and wherein the processor is further configured to execute the setting program and control the setting device to apply any one of the first setting value and the second setting value selected to the parameter so as to control the machine tool based on the applied setting value.

* * * * *